MOLDING MACHINES

Original Filed March 15, 1966 6 Sheets-Sheet 1

INVENTOR
RICHARD K. SHELBY
BY
Robert J. Schaap
ATTORNEY

MOLDING MACHINES

Original Filed March 15, 1966 6 Sheets-Sheet 2

INVENTOR
RICHARD K. SHELBY
BY
Robert J. Schaap
ATTORNEY

MOLDING MACHINES

Original Filed March 15, 1966 6 Sheets-Sheet 3

INVENTOR
RICHARD K. SHELBY
BY
Robert J. Schaap
ATTORNEY

MOLDING MACHINES

Original Filed March 15, 1966 6 Sheets-Sheet 4

INVENTOR
RICHARD K. SHELBY
BY
Robert J. Schaap
ATTORNEY

MOLDING MACHINES

Original Filed March 15, 1966 6 Sheets-Sheet 5

INVENTOR
RICHARD K. SHELBY
BY
Robert J. Schaap
ATTORNEY

INVENTOR
RICHARD K. SHELBY
BY
Robert J. Schaap
ATTORNEY

United States Patent Office

Re. 27,435
Reissued July 18, 1972

27,435

MOLDING MACHINES

Richard K. Shelby, Chicago, Ill., assignor to Monsanto Company, St. Louis, Mo.

Original No. 3,341,895, dated Sept. 19, 1967, Ser. No. 534,442, Mar. 15, 1966, which is a continuation-in-part of Ser. No. 333,440, Dec. 26, 1963. Application for reissue Nov. 4, 1970, Ser. No. 87,022
Int. Cl. B29c *17/04*
U.S. Cl. 425—167 17 Claims

Matter enclosed in heavy brackets [ ] appears in the original patent but forms no part of this reissue specification; matter printed in italics indicates the additions made by reissue.

ABSTRACT OF THE DISCLOSURE

A molding machine having cooperating shiftable lower and upper die frames, the upper having cavities and lower having plug assists for urging a thermoplastic web into the cavities by the plug assists responsive to shifting of the frames. A water cooled stripping plate is shiftable on the underside of the upper frame and strips the web from the upper frame. A web clamping frame is shiftable with respect to the lower frame and has an individual clamping ring around each plug assist and a peripheral clamping rim for engaging the web. A pressure applicator is also disposed around each plug assist enabling positive pressure injection around the plug assist. A vacuum is created around the inside of each of the cavities. A vacuum is created between the upper die frame assembly and the web when the clamping frame is shifted upwardly.

This application is a continuation-in-part of my copending application Ser. No. 333,440, filed Dec. 26, 1963, now U.S. Patent No. 3,268,952.

This invention relates in general to certain new and useful improvements in molding machines, and more particularly, to positive pressure forming apparatus for molding machines used in the formation of plastic articles.

Today, there have been widespread advancements in the packaging industry with the introduction of containers formed of plastic and synthetic resinous materials. In fact, it has become a common practice to manufacture thin-walled disposable containers such as drinking cups, ice cream cups and the like from moldable, thermoplastic materials such as polystyrene and modified polystyrene. There are a large number of commercially available molding machines which are designed to form thin-walled containers from sheets of thermoplastic material. In this art of forming articles from thermoplastic materials, the injection molding and pressure molding methods have been most advantageously employed. Molding machines which employ the pressure molding method generally comprise a device for feeding a sheet of thermoplastic material, either intermittently or continuously, between cooperating dies. The dies are adapted to engage the movable web of thermoplastic material generally in a shifting movement and form the plastic material to a shape generally conforming to that of the receiving die.

The pressure or so-called vacuum molding process employs the vacuum as an assist for drawing the thermoplastic web into the die along with the mechanical engagement of the web by a plug assist. It has been found that the overall thickness of the walls of the article produced are more uniform when a vacuum assist is employed with the mechanical engagement of the web in causing the deformation of the web. This type of device is designed so that the side of the sheet which is formed by the male die is generally maintained at atmospheric pressure while the side of the sheet which is formed within the female die is maintained at pressures less than atmospheric pressure to provide the vacuum forming of the plastic article. Moreover, this type of operation generally eliminates undesirable flow lines which present an undesirable appearance to the finally shaped article. There have also been recent attempts to employ positive air pressure assists around the male die to obtain a greater pressure differential. However, all of such attempts, to date, have been ineffective for a number of reasons.

Devices of this latter mentioned type, namely the devices which employ the differential air pressure must necessarily include an effective sealing means between the die frames in order to achieve an adequate pressure differential. In many of these devices, the die frames may shift longitudinally with the moving web on a suitable carriage as the web is fed continuously into the molding machine. The die frames reciprocatively shift longitudinally for a predetermined distance and are then automatically returned to their initial position. In other devices, the die frames are stationarily mounted with respect to the web and the web is intermittently halted in its operation during the actual molding. However, in each of these devices it is quite difficult to maintain adequate sealing between the thermoplastic web and the male and female die frame so that both a positive pressure and a vacuum assist may be employed on opposite sides of the web. This problem is even more considerable when the plastic web and the continuously moving die frames are operating at relatively high rates of speed.

It is, therefore, the primary object of the present invention to provide a molding machine which is capable of providing a positive pressure seal between a web of thermoplastic material and cooperating die frames which shift into and out of contact with the thermoplastic material.

It is another object of the present invention to provide a positive pressure forming apparatus for molding machines and similar devices which is capable of maintaining a positive pressure seal between a moving web of thermoplastic material and die frames which shift in a direction perpendicular to the web.

It is a further object of the present invention to provide a positive pressure forming apparatus of the type stated which is capable of being used with molding machines which employ continuously moving webs of moldable material and with molding machines which intermittently halt the movement of the thermoplastic web during molding operations thereof.

It is an additional object of the present invention to provide a molding machine of the type stated where reciprocating die frames are capable of rapidly achieving an air-tight seal with a rapidly moving web of thermoplastic material during the forming operation and rapidly breaking the air-tight seal thereafter.

It is also an object of the present invention to provide a molding machine of the type stated which is highly efficient in its operation and is capable of mass-producing molded articles of relatively uniform thickness and at a low unit cost.

It is another salient object of the present invention to provide a molding machine of the type stated which has a high volume production capacity and which may be rapidly and conveniently converted to manufacturing requirements for various types and sizes of containers.

With the above and other objects in view, my invention resides in the novel features of form, construction, arrangement and combination of parts presently described and pointed out.

In the accompanying drawings (6 sheets):

FIGURE 5 is a vertical sectional view similar to the ertical sectional view of FIGURE 4 and showing the ɔoperating die frames in the closed or "molding" posi-on.

GENERAL DESCRIPTION

Figure 1:
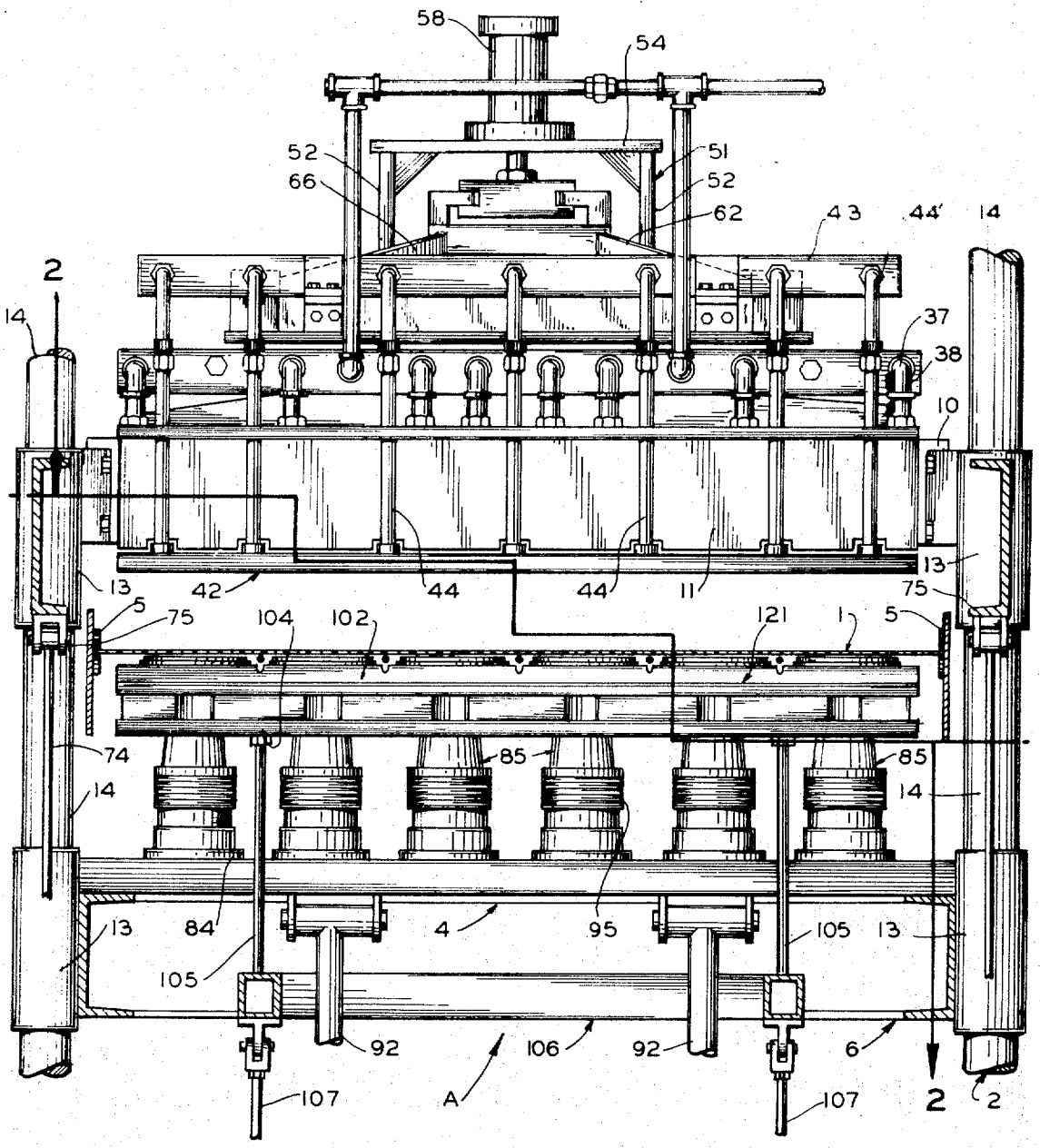
FIGURE 1 is a transverse sectional view, partially roken away, of a molding machine constructed in accordance with and embodying the present invention.

Generally speaking, the present invention relates to a ıodified form of the molding machine described in Jnited States Letters Patent No. 2,967,328 to R. K. Shelby t al. with substantial improvements in the method of ıaping the thermoplastic web. The molding machine of ıe present invention generally comprises an outer sup-orting structure. Operatively mounted on the supporting :ructure and being adapted for reciprocative movement ı a substantially horizontal path is a molding carriage. 'he molding machine is also provided with a conveyor ystem for advancing a web of thermoplastic material long a substantially horizontal path concurrently with ıe movement of the molding carriage through the ma-hine. The molding machine is further provided with a ming mechanism for intermittently shifting the molding arriage in the direction of the advancing web of thermo-lastic material for a preselected distance and at the same elative rate of speed as the web. After the carriage has een shifted to its forwardmost advanced position in the irection of movement of the web, it is automatically eturned to its original position. A shifting movement of ıe molding carriage to its forwardmost position and re-ırn to its original position constitutes one molding cycle.

Operatively mounted on the longitudinally shifting ıolding carriage are a pair of upper and lower die frames 'hich are disposed on opposite sides of the advancing 'eb of thermoplastic material. The die frames are suit-bly provided with male and female die elements which re adapted to engage portions of the thermoplastic web nd form the material contained in these portions of the 'eb into molded articles. The upper and lower die frames re shifted into and out of engagement with the web in med relation to the movement of the web and in timed elation to the longitudinally shifting movement of the arriage frame. In this manner, the molding operation is ontinuous and uninterrupted during the actual forming f the thermoplastic material. A web clamping support late having a series of web clamping rings is operatively ıiftable with the lower die frame and is adapted to ngage the underside of the web of thermoplastic mate-al during the actual forming operation.

The means for shifting the upper and lower die frame nd the web clamping plate is more fully described in ıy copending application Ser. No. 333,440, filed Dec. 6, 1963, now U.S. Patent No. 3,268,952, and is there-ɔre, neither illustrated nor described in detail herein.

The upper die frame includes a plurality of female die ıembers or cavities, the interior shape of which generally onforms to the desired shape of the finally molded ar-cle. The cavity is surrounded by a fluid manifold which capable of applying pressure to the internal portion of ıe cavity or maintaining a vacuum thereon. Further-ıore, the cavity is surrounded by a water cooled jacket 'hich is adapted to cool the thermoplastic material re-ained therein after the molding operation and before the article is removed from the cavity. Similarly, a water cooled stripping plate is mounted on the underside of the upper die frame and is adapted to engage the upper surface of the thermoplastic web. The lower die frame carries a plurality of male dies or so-called "plugs" or "plug assists." The plug assist generally conforms to the interior shape of the cavity and is adapted to engage the web of thermoplastic material and urge the same into the cavity. The plug assist is internally provided with a heater for better flow control of the material during the actual molding operation. A positive pressure applicator surrounds each plug assist and is movable therewith. A unique gasket on the upper end of the positive pressure applicator, which is preferably in the form of a bellows, is adapted to engage the underside of the web of thermoplastic material when the plug assist forces the plastic material into the cavity. A vacuum is maintained on the cavity to assist the positive pressure application and draw the plastic material against the walls of the cavity. Air under positive pressure is thereafter injected into the bellows or pressure applicator and when the pressure is sufficiently high, will force the web of thermoplastic material against the side walls of the cavity, thereby providing a better forming operation. A web clamping frame is provided with a plurality of web clamping rings, each of which surrounds a positive pressure applicator and plug assist. The web clamping ring is also adapted to engage the under side of the web of thermoplastic material causing a drape of the material. This type of technique provides a greater portion of material within a selected area which is capable of being stretched and formed in the molding operation.

After the completion of the molding operation, the clamping frame and lower die frame, which carries the plug assists is shifted downwardly. The vacuum which was maintained on the cavity is eliminated and air under positive pressure is injected in the cavity in order to force the thermoplastic material outwardly therefrom. Additionally, as the upper die frame shifts upwardly, the stripper plate will be momentarily positioned so that it holds the plastic material away from the upper die frame as the latter shifts upwardly. Furthermore, a vacuum is maintained on the upper side of the web of thermoplastic material so that the material is cooled by the water-cooled stripper plate. Thereafter, the stripper plate shifts upwardly permitting the finally formed articles to continue movement to a cutter device for stripping the molded articles from the web of thermoplastic material.

DETAILED DESCRIPTION

Referring now in more detail and by reference characters to the drawings, which illustrate a preferred embodiment of the present invention, A designates a molding machine which is similar to the molding machine described in the aforementioned Shelby et al. Patent No. 2,967,328 and which is adapted to form relatively thin-walled containers from a continuously moving web 1 of thermoplastic material. The containers which are formed on the continuously moving web 1 are moved in successive groups consisting of six rows of seven cups across with all of the cups in this group being formed in one molding cycle of the machine.

Carriage structure

Figure 2:
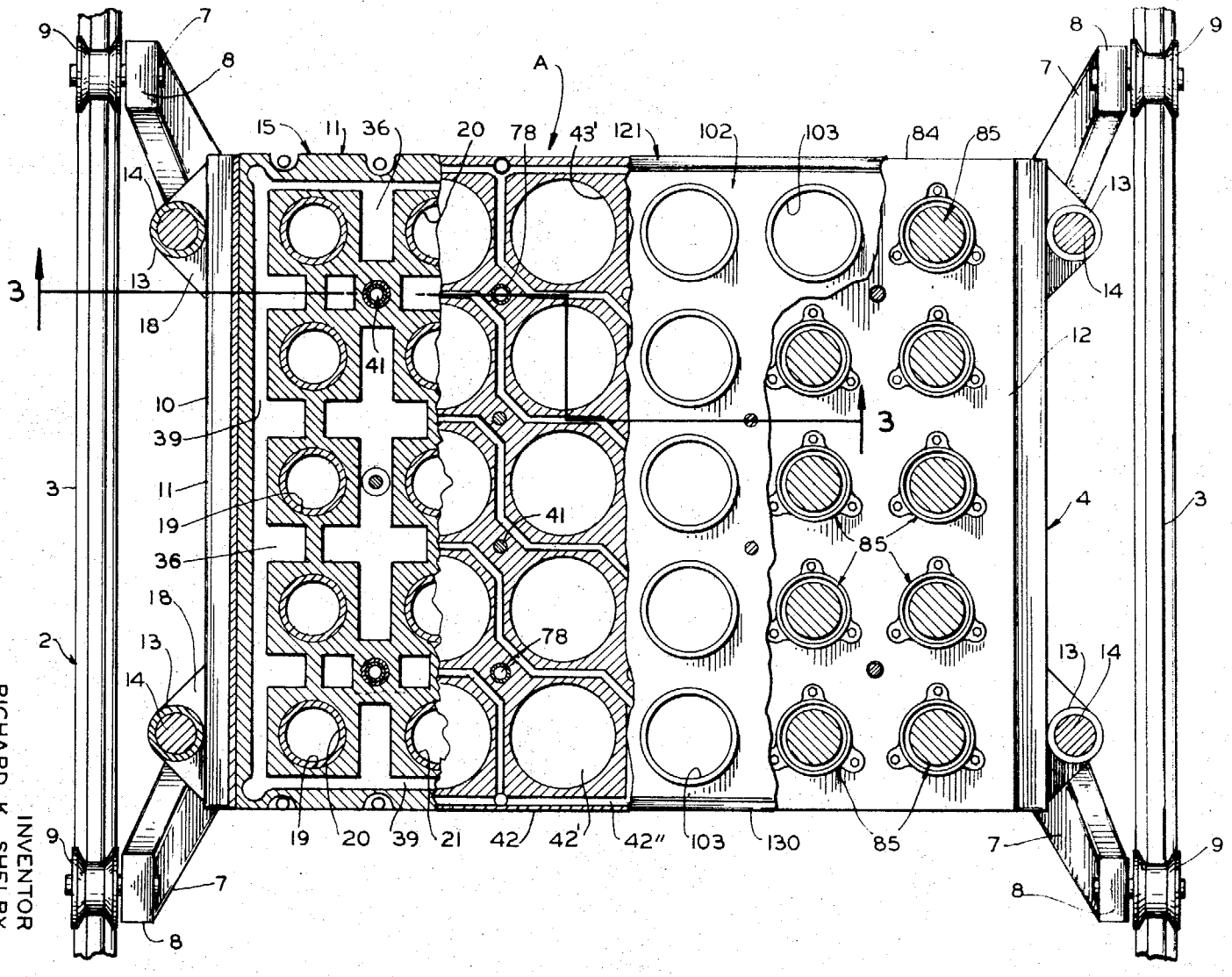
FIGURE 2 is a horizontal sectional view taken along ne 2—2 of FIGURE 1 and showing portions of the ıolding machine at various horizontal elevations.

Proper orientation of the molding machine illustrated herein and the machine illustrated in my copending application Ser. No. 333,440, filed Dec. 26, 1963, can be obtained by comparison of the drawings. It can be seen that FIGURE 1 of the present application corresponds to FIGURE 4a and 4b of the aforementioned copending patent application. The molding machine A generally comprises a main supporting frame 2 including upper and lower frame structures (not shown) which are formed of heavy metal I beams. Welded or otherwise rigidly secured to the upper frame structure are a pair of transversely spaced longitudinally extending carriage supporting rails 3 which support a traveling molding carriage 4 substantially as shown in FIGURE 2. The carriage 4 is shiftable along the rails 3 for reciprocative movement in a horizontal direction and longitudinally with respect to the main supporting frame 2. It starts at an initial position and is intermittently moved for a predetermined distance in a direction of advance of the web 1 and at the same speed as the movement of the web 1. Thereafter, the carriage 4 is returned to its initial position for the start of a new molding cycle. The mechanism for driving the carriage 4 is not part of the inventive concept of this present application and is, therefore, neither illustrated nor described in detail herein. This mechanism is, however, more fully described in the aforementioned Shelby et al. Patent No. 2,967,328. The web 1 is advanced continuously through the molding machine A by a web conveying and gripping structure 5 as illustrated in FIGURE 1. During the forward movement of the carriage 4, the molding elements carried thereon cooperate and engage the web 1 to form a series of containers on a predetermined area of the web 1. The forming operations are completed when the carriage 4 reaches the end of its path in the direction of the advancing movement of the web 1.

The molding carriage 4 is constructed in the form of a box-like frame structure having a somewhat rectangular lower carriage frame 6. Welded or otherwise rigidly secured to the carriage frame 6 are four obliquely and upwardly extending legs 7, each being provided with integrally formed outwardly struck supporting brackets 8. Rotatably mounted on each of the brackets 8 are internally flanged rollers 9 which are rotatably disposed on the supporting rails 3 for supporting the carriage 4 during its shifting movement. The molding carriage 4 also includes an upper carriage frame 10 which carries thereon a sub-frame or so-called "die frame" 11 of generally rectangular shape. In similar manner, the lower carriage frame 6 carries a sub-frame or so-called die frame 12. The details of construction of the carriage frame 6 and 10 and the sub-frames 11 and 12 are more fully illustrated and described in the aforementioned Shelby Patent No. 2,967,328. Bolted to the corners of each of the subframes 11, 12 are guide sleeves 13 which are shiftable on vertically extending guide rods 14, in the manner as shown in FIGURE 1. The guide rods 14 are rigidly secured to and extend between the lower and upper carriage frames 6, 10 respectively. The method of shifting the upper and lower die frames 11, 12 is more fully described in my copending application Ser. No. 333,440, filed Dec. 26, 1963, and is, therefore, not described in detail herein.

Cavity containing die frame

Figure 3:
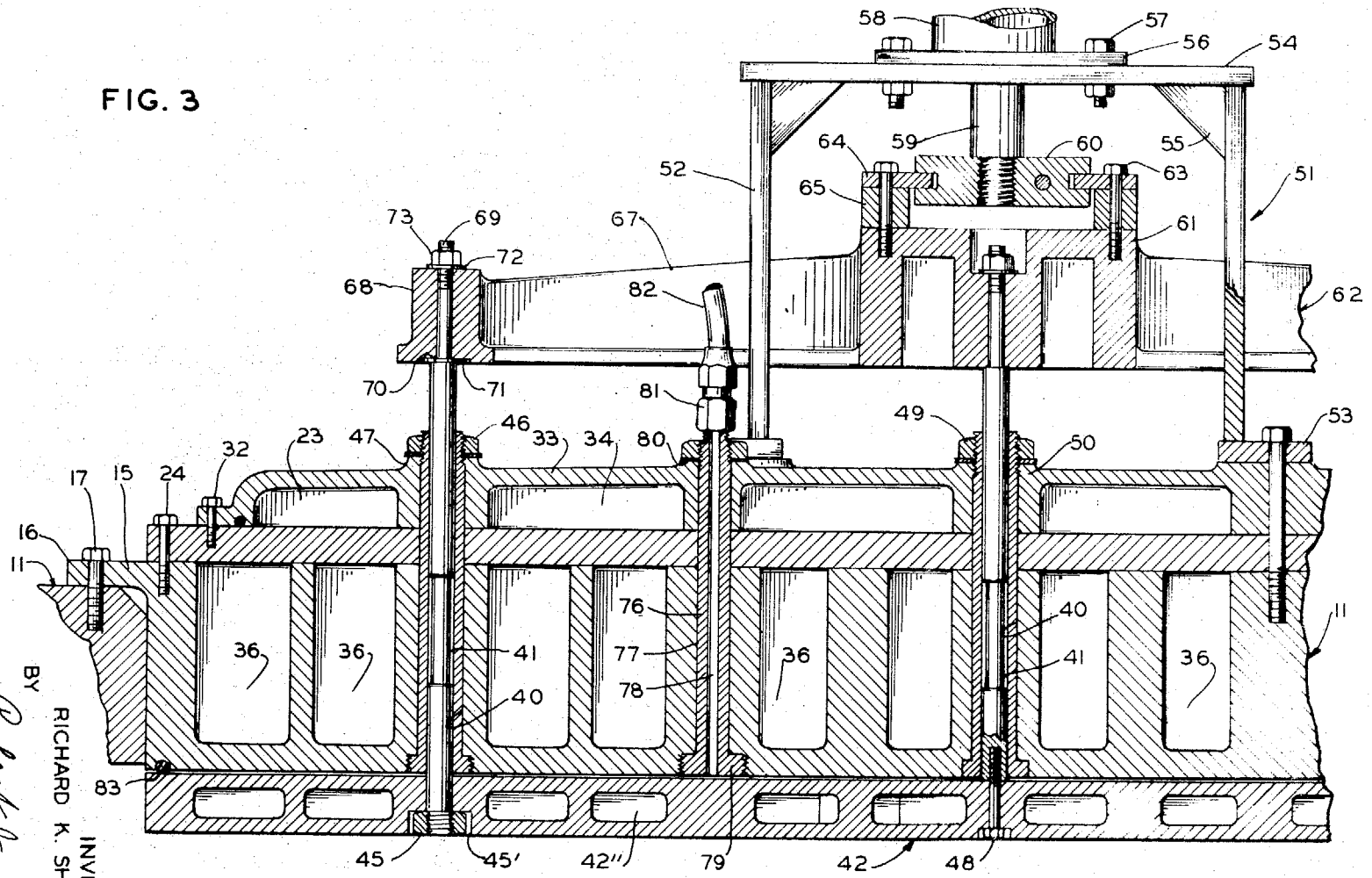
FIGURE 3 is a fragmentary sectional view taken along ne 3—3 of FIGURE 2.
Figure 4:
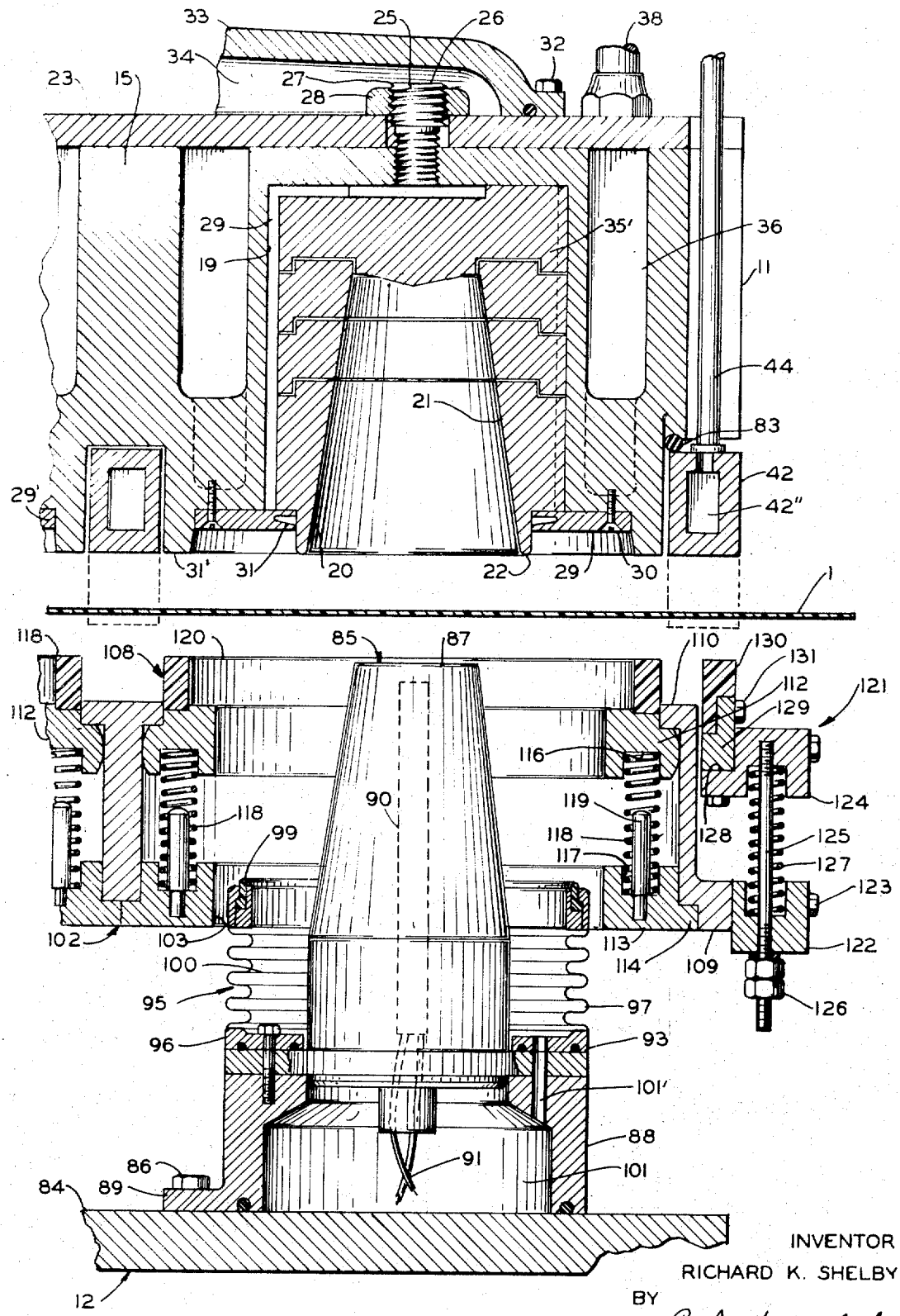
FIGURE 4 is a vertical sectional view, partially broken way taken along line 4—4 of FIGURE 1 and showing ıe cooperating die frames in detail.

The upper subframe 11 is more fully illustrated in FIGURES 1, 3 and 4. A die holding block 15 is provided with lateral flanges 16 for securement to the upper subframe 11 by means of bolts 17. Furthermore, the die holding block 15 is secured to the subframe 11 by means of brackets 18. The die holding block 15 is internally provided with a series of die-receiving pockets 19 for accommodating molding dies 20, often termed a "forming block" or so-called "female molding block." Each of the molding blocks 20 is provided with cavities 21 of the desired shape and cross section of an article to be ultimately formed. In the apparatus of the present invention, the molding cavity 21 has a shape which conforms to the exterior of a cup or other article which is to be formed in the molding machine. The cavity 21 is relatively deep and is provided at its lowermost edge with a bead-like formation 22 for forming a rim or bead on the cup which is ultimately produced, the bead-like formation 22 extending somewhat below the lowermost face of the molding die 20. By reference to FIGURE 2, it can be seen that the die holding block 15 is provided with a series of six rows in the longitudinal dimension and each row containing five cavities or a total of thirty cavities 21. A preferred embodiment of the present invention provides a total of forty-two cavities in the die holding block; but it should be recognized that the die holding block 15 can be constructed with any desired number of cavities.

A cover plate 23 is secured to the top face of the die holding block 15 by means of studs 24 and encloses the upper ends of each of the pockets 19. The cover plate 23 is also retained by means of hollow studs 25 having enlarged heads 26. The studs 25 are provided with external threads 27 for accommodating nuts in the manner as illustrated in FIGURE 4.

By further reference to FIGURE 4, it can be seen that the molding die 20 has a slightly smaller diametral size than the pocket 19 and thereby forms a pressure chamber or so-called air chamber 29 surrounding the pocket. It can be seen that each of the molding dies 20 is mounted in a similar manner and that the molding die 20 in FIGURE 4 is representative of the overall construction of the die holding block 15.

Each of the molding blocks 20 is held in place by means of a retainer ring 29', which is secured to the die holding block 15 by means of machine screws 30. Furthermore, each of the molding dies 20 is provided with radial outwardly extending ears 31, which are capable of being bent inwardly by the retainer ring 29' so that tight-fitting engagement of the retainer ring 29' against the molding die 20 and die holding block 15 is maintained. The retaining rings 29' are fitted between the bead-like formation 22 and an annular downwardly extending boss 31' formed with the die holding block 15 and concentrically surrounding each of the molding dies 20 in the manner as illustrated in FIGURES 4 and 5.

Rigidly secured to the top surface of the cover plate 23 by means of bolts 32 is a pressure manifold 33 which communicates with each of the pressure chambers 29 through the hollow studs 25, in the manner as illustrated in FIGURES 3 and 4. The pressure manifold 33 forms a pressure chamber 34, which is in communication with the pressure chambers 29 through a hollow duct 35 formed in each of the studs 25. The chamber 34 is connected through a two-way valve to a vacuum source (not shown) and to an air pressure source (not shown).

Through this mechanism, the pressure chamber 34 and the pressure chambers 29 in each of the pockets for accommodating the molding dies 20 are maintained alternately under positive pressure and under a vacuum, for reasons which will presently more fully appear. The pressure chambers 29 communicate with the molding cavities 21 by means of a spiral groove 35' which is formed within the wall of each of the molding blocks 20 in the manner as illustrated in FIGURE 4. Thus when the pressure chamber 34 is maintained under vacuum conditions, the molding cavities 21 are also maintained under vacuum conditions; and when the pressure chamber 34 is maintained under positive pressure conditions the molding cavities 21 are similarly maintained under positive pressure conditions.

Figure 5:
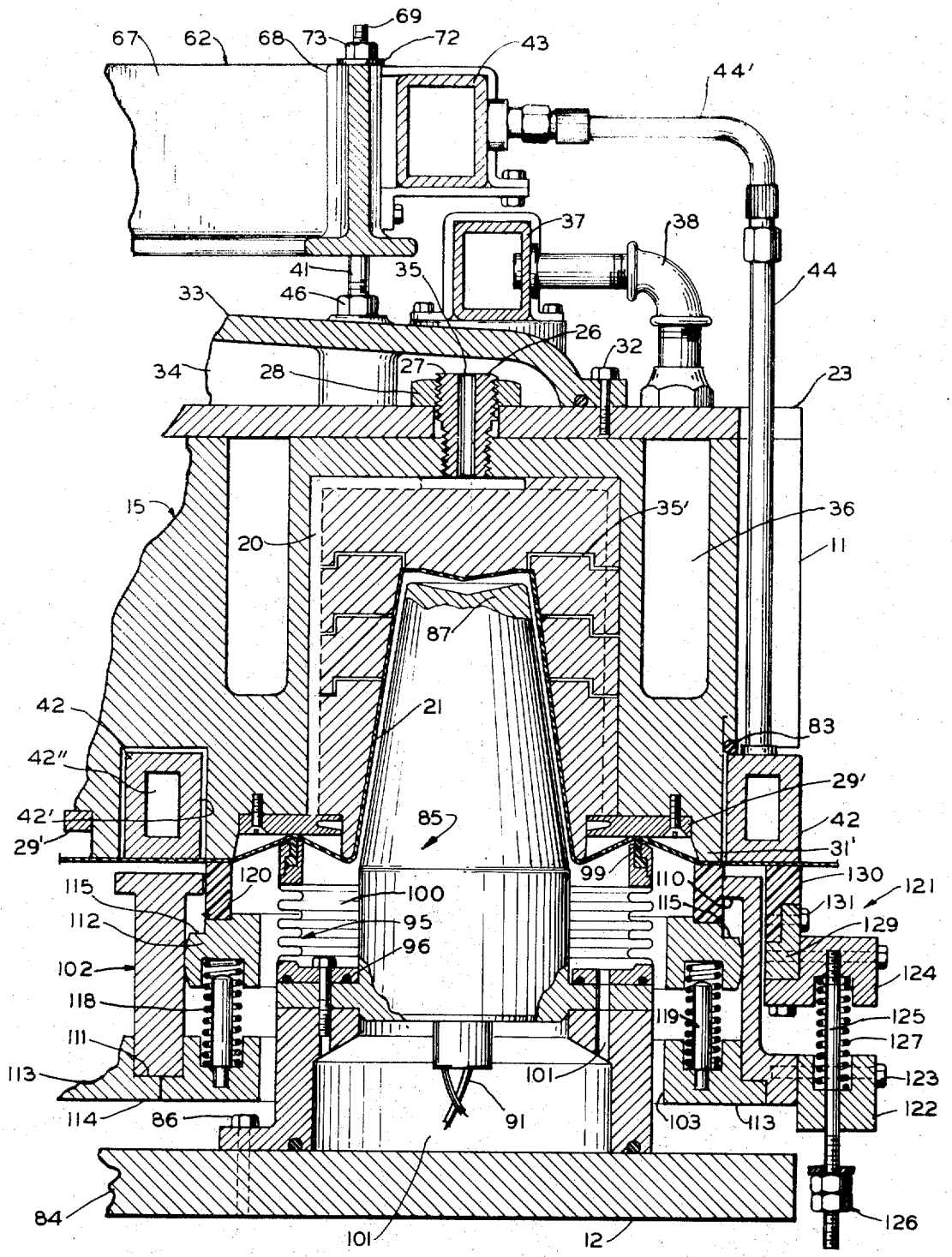

Each of the molding dies is surrounded by water jackets 36 which are more fully illustrated in FIGURES 2, 3 and 5. The water jackets 36 are, in turn, connected to a cooling water manifold 37 by means of a series of pipe connections 38. In this manner, cooling water is continually circulated through the water jackets 36 surrounding each of the molding dies 20. In this manner, a partial polymerization of the thermoplastic material is effected by means of the heat supplied from plug assists hereinafter described in detail when the thermoplastic material is forced into the molding cavities 21. The cooling effect created in the cavities 21 by means of the water jackets 36 imparts a slight dimensional set and rigidity to the thermoplastic material as it is being formed in the molding cavities 21. By reference to FIGURE 2, it can be seen that the water jackets 36 surrounding each of the molding ies 20 are connected by means of a plurality of fluid ucts 39. Accordingly, the cooling water is capable of owing through a circuitous path throughout the die olding block 15 in order to insure complete cooling round each of the molding dies 20. The manifold 37 is, ı turn, connected to a source of cooling water (not ıown). It has been found in connection with the presnt invention that the employment of an entire water cket such as the type illustrated in FIGURE 3 is far ıperior to a series of pipes which may extend around the ıolding die 20.

Stripper mechanism

The die holding block 15 is provided with a series of ertical bores 40 for accommodating connecting rods 41 hich, in turn, carry a horizontally disposed stripper plate 2, all as can best be seen in FIGURE 3. The stripper late 42 is vertically shiftable with respect to the die olding block 15 in a manner to be hereinafter described ıd is adapted to strip the movable web 1 from the die olding block 15 after the forming operation. The stripper plate 42 is provided with matching aligned apertures 2' which provide communication with the forming cavies 21. By reference to FIGURE 2, it can be seen that the ripper plate 42 is provided with a series of fluid pasıges 42'', which provide a cooling medium for the greater ortion of the metal area in the stripper plate 42. The uid channels 42'' are connected to a cooling fluid maniıld 43 through a stainless steel pipe 44 and also through flexible tubing 44' in the manner as shown in FIGURE . Thus, a cooling fluid is continually supplied to the ıe stripper plate which is in normal engagement with the ripper plate 42. In the operation of the molding machine, pper surface of the web 1 during molding, is moved ownwardly at the end of each cycle, with respect to the ie holding block 15 to prevent the formed cups from llowing the upper molding carriage 10 as the latter is ıoved upwardly to its retracted position.

Each of the connecting rods 41 is shiftable within the ertical bore formed in the die holding block 15 so that ıe connecting rods 41 and the stripper plate 42 is shiftıle with respect to the die holding block 15. By reference FIGURE 3, it can be seen that two types of connectıg bars are employed. The connecting rod 41 is exterally threaded at its lower end and is sized to accommoıte a spanner nut 45 fitted within a nut receiving slot 5' formed in the bottom face of the stripper plate 42. locking nut 46 is also concentrically disposed about the onnecting rod 41 and is recured to a hub 47 on the upper ıd of the pressure supply manifold 33. The second type connecting rod which serves as a center rod terminates the bottom face of the die holding block 15 and is reined by means of socket cap screws 48. A locking ut 49 is also concentrically disposed around the center onnecting rod 41 and is secured to a hub 47 on the upper formed on the mainfold 33. By reference to FIGURE , it can be seen that transverse rows of connecting rods 1 are located at each of the ends of the die holding lock 15 for retaining the stripper plate 42. Each of ıese rows of connecting rods 41 is provided with spanner uts 45 at their lower end. By further reference to FIGRE 2, it can also be seen that a transverse row of center onnecting rods 41, which are retained by means of socket ead cap screws 48 is also employed.

Welded or otherwise rigidly secured to the upper surıce of the pressure manifold 33 is a table-like support ame 51 including four spaced uprights 52, which are ecured to mounting blocks 53 at their lower ends, the locks 53, in turn, being secured to the top face of the ıanifold 33. Connected to the upper ends of the uprights 2 is a horizontally disposed support plate 54, which is einforced by means of gussets 55 at each of the uprights 2. Secured to the top face of the support plate 54 by ıeans of a mounting plate 56 and bolts 57 is a pneuıatic drive cylinder 58 having an extensible piston rod

59. The lower end of the piston rod 59 is diametrally reduced and rigidly threaded into a connecting plate 60. The connecting plate 60 is bolted to an enlarged center hub 61 of a stripper support frame 62 by means of bolts 63. The bolts 63 extend through outwardly extending flanges 64 secured to the connecting plate 60 and through spacer blocks 65 which snugly fit between the flanges 64 and the upper face of the enlarged hub 61, in the manner as illustrated in FIGURE 3.

The stripper support frame 62 is a so-called spider-type support frame having four spider-type legs 66 radiate outwardly from the hub to the frame corners and two transversely extending center legs 67 which also radiate from the hub 61. Each of the legs 66, 67 is provided with enlarged rod-receiving sockets 68 for receiving the upper reduced ends 69 of the connecting rods 41. Each of the rods 41 is diametrally reduced at its upper ends and form shoulders 70 which abut against support washers 71, the latter being fitted within slots formed in the lower ends of each of the rod-receiving sockets 68, in the manner as shown in FIGURE 3. Each of the diametrally reduced portions 69 of the connecting rods 41 is also externally threaded at its uppermost ends for accommodating washers 72 and locking nuts 73. By means of this construction, it can be seen that the stripper plate 42 is movable with the stripper support frame 62 and which is, in turn, powered through the pneumatic cylinder 58. The cylinder 58 is, in turn, connected to a suitable source of air pressure (not shown).

By reference to FIGURES 1 and 3, it can be seen that the stripper plate 42 is shiftable with the die holding block 15 and is also provided with a small degree of independent movement with respect to the die holding block 15. The die holding block 15, which is, in turn, mounted on the subframe 11 is movable through driving rods 74, which are pivotally connected to the subframe 11 by pivot blocks 75. The drive rods 74 are, in turn, connected to a driving mechanism for shifting the die frame and which is more fully illustrated in my aforementioned copending application Serial No. 333,440, filed December 26, 1963. In this manner, the upper die frame 11 is shifted in a vertical direction as the carriage 4 shifts longitudinally with respect to the support frame 2. Furthermore, as the upper die frame 11 is shifted downwardly, the web 1 is engaged by the motion surface of the stripper plate 42. In order to remove the cups ultimately formed from the die cavities 21, the die frame 11 is shifted upwardly at the end of the molding cycle. However, at this point, the pneumatic cylinder 58 is actuated extending the piston rod 59 and which, in turn, shifts the stripper support frame 62 downwardly with respect to the die holding block 15. The connecting rods 41 are shiftable in the bores 40 and thereby cause a separation of the stripper plate 42 and the die holding block 15. This will, in turn, prevent the web 1 from moving upwardly with the die holding block 15. As the piston rod 59 reaches the end of its limit of travel, thhe stripper plate 42 will then continue to shift upwardly with the die holding block 15.

Vacuum assist for molding cavities

The die holding block 15, and the cover plate 23 are also vertically drilled in the provision of bores 76 to accommodate vacuum tubes 77 having hollow passageways 78. The vacuum tubes 77 are enlarged in the form of spanner nuts 79 at their lower ends and are externally threaded in the manner as shown in FIGURE 3. The spanner nuts 79 are fitted and secured in internally threaded sockets formed in the bottom wall of the die holding block 15. Upstanding bosses 80 are formed on the top face of the air supply manifold 33, and are internally apertured to accommodate the upper ends of each of the vacuum tubes 77. The vacuum tubes 77 are externally threaded at their upper ends for accommodating locking nuts 80' which are seated on the bosses 80, thereby holding the vacuum tubes 77 securely in place. A fitting 81 is also secured to each of the upper ends of the vacuum tubes 77 and are connected by flexible tubes 82 to a suitable source of a vacuum (not shown). In this manner, a vacuum can be maintained between the lower surface of the die holding block and the upper surface of the stripper plate 42. An annular neoprene sealing ring 83 is mounted on the underside of the die holding block 15 and engages the upper surface of the stripper plate 42 in a sealingwise position when the die holding block 15 and the stripper plate 42 are closed in the manner as shown in FIGURES 3 and 5. Due to the existence of the sealing ring 83, a vacuum can be maintained between the bottom face of the die holding block 15 and the upper surface of the stripper plate 42. The web is not perfectly engageable with each increment of the undersurface of the die holding block 15 and, therefore, the vacuum can extend to each of the annular bosses and into the area formed by the retaining rings 29'. Therefore, a vacuum is maintained along the lower edge of each of the molding cavities 21 so that the portion of the web 1, which is not internally disposed in the molding cavities 21 will have only the proper amount of drape and furthermore, will be held against the bottom face of the die holding block 15.

Plug assists and pressure applicators

The lower die frame 12 carries a relatively heavy mounting plate 84 and which is vertically shiftable with the lower die frame 12. A series of male-forming dies or plug assists 85 are secured to the mounting plate 84 by means of bolts 86, reference being made to FIGURES 1 and 5. The plug assists 85 are located in rows and columns which match the molding cavities 21 and accordingly, a plug assist 85 is provided for each molding cavity 21. Each of the plug assists 85 comprises an upper terminal or head portion 87 of which the exterior shape conforms generally to the interior shape of the cup being produced. The molding head 87 is mounted on an upright post or stem section 88, which is provided with an outwardly flaring flange 89 for securement to the mounting plate 84. The stem section 88 of each plug assist 85 is internally bored to accommodate a suitable heating element 90. Each of the heating elements 90 is provided with suitable leads 91 connected to a source of electrical power (not shown). A driving mechanism including a pair of driving links 92 is pivotally connected to the underside of the mounting plate 84 for shifting the entire lower die frame toward and away from the web 1 in timed relationship to the movement of the uper die frame 11. This driving mechanism, however, is also more fully illustrated in my copending application Serial No. 333,440, filed December 26, 1963.

The molding head 87 is provided with an upwardly presented flat shoulder surface 93 and supportively secured thereto by means of bolts 94 is a positive pressure applicator 95 of the type described in my copending application Ser. No. 534,325, filed Mar. 15, 1966. The positive pressure applicator 95 is preferably provided with a base 96 having a side wall 97 in the form of a bellows. The side wall 97 carries a head member 98 which is provided with a unique sealing gasket 99 for engaging the underside of the thermoplastic web 1 when the plug assist 85 forces the web of thermoplastic material into the cavity. A so-called "solid bellows" which employs a flexible rubber sealing ring for expansionary movement by means of a metal shoe, may also be employed. This latter type of positive pressure applicator is also described in my copending application Serial No. 546,790, filed May 2, 1966. By reference to FIGURE 4, it can be seen that the positive pressure applicators 95 are spaced from the side wall of the stem section 88 and thereby provide a positive pressure chamber 100 which communicates with an air manifold 101 by means of an air duct 101' formed in the head portion 87. Thus, when the plug assist 85 is shifted to its uppermost position and forces the portion of the thermoplastic web 1 into the cavities 21, the sealing gasket 99 will engage the underside of the web 1 thereby forming an air-tight seal. Air under positive pressure from the manifold 101 is then injected into the pressure applicator 95 and hence into the pocket formed by the thermoplastic web 1, which has been pushed into the cavity 21. Consequently, this injection of air under positive pressure will assist in the mechanical forming operation.

Web clamping mechanism

A web clamping support plate 102 is horizontally disposed between the undersurface of the web 1 and the mounting plate 84 in the manner as illustrated in FIGURE 1. The support plate 102 is provided with rows of aligned apertures 103 for accommodating each of the plug assists 85 as the plug supporting or lower die frame 12 is shifted upwardly toward the web 1. The plate 102 is provided with four sockets 104 on its underface and which are secured to the threaded upper ends of four spaced guide rods 105, the latter extending through guide apertures formed in the mounting plate 84. At their lower ends, the guide rods 105 are secured to a web clamping support frame 106, which is substantially rectangular in horizontal cross section. The web clamping support frame 106 is powered through actuating rods 107. The web clamping support frame 106 and the mechanism for operating the same in timed relationship to the movement of each of the upper and lower die frames is more fully described in my copending application Serial No. 333,440, filed December 26, 1963, and is, therefore, not described in detail herein.

Each of the apertures 103 on the web clamping support plate 102 has associated therewith a clamping ring 108, which can best be seen in FIGURES 4 and 5. Each of the apertures 103 is provided with a rim forming sleeve 109 having inwarded struck annularly extending limit flanges 110. The sleeves 109 are also provided with shoulder or attachment surfaces 111 at their lower ends. Inserted in the sleeves 109 are circular cooperating upper and lower shoes 112, 113, the lower shoes 113 having annular flanges 114 along their lower ends for securement to the attachment surfaces 111 in the manner as illustrated in FIGURE 5. The upper shoe 112 of each clamping ring 108 is slidable in a vertical direction in the sleeve 109 and has an annular groove 115 along its upper end which is sized to accommodate the annular flange 110, in the manner as illustrated in FIGURE 4. The upper and lower shoes 112, 113 is each provided with vertically opposed annular U-shaped grooves 116, 117 for accommodating a series of compression springs 118. A series of upstanding guide bars 119 are secured to the lower shoe 113 and are concentrically disposed within the springs 118. Accordingly, the upper shoe 112 is always biased to its uppermost position, that is the position as illustrated in FIGURE 4. Rigidly secured to the upper surface of each of the upper shoes 112 is an annularly extending Bakelite retaining ring or so-called sealing ring 120. The web clamping support plate 102 is adapted to be moved upwardly to bring the retaining ring 120 into engagement with the bottom face of the web 1, when the plug assists 85 are shifted to the uppermost position. The retaining or sealing ring 120 is engageable with the undersurface of the web 1 and forces the same against the retainer ring 29', in the manner as illustrated in FIGURE 5, when the plug assist 85 is shifted upwardly. By means of this construction, the protruding bead-like formation will cause a drape of the portion of the thermoplastic material circumscribed by the retaining ring 120, and thereby hold the web 1 in fixed relation to the forming members during the forming of the plastic cup.

A peripheral clamping mechanism 121, which extends around the outer margin of the clamping support plate 102 is also provided for engaging the underside of a selected area of the web 1, when the lower die frame 12 is shifted to its uppermost or "molding" position. The eripheral clamping mechanism 121 includes a lower ıoe 122, which is secured to a sleeve 109 by means of olts 123. An upper shoe 124 is slidable in a vertical irection with respect to the lower shoe 123 and is etained in alignment therewith by means of guide rods 25, which are secured to the upper shoe 124. The ower shoe 122 is also centrally apertured in a series of laces for accommodation of the guide rods 125 and ırthermore the guide rods 125 are provided with ashers and nuts 126 at their lower ends, which proide a limit of travel of the uper shoe 124. A compresion spring 127 is concentrically disposed about each uide rod 125 and biases the upper shoe 124 to its upperıost position, reference being made to FIGURE 5. The pper shoe 124 is also provided with an inwardly exending annular retaining flange 128 along its lower end or accommodatig a retaining block 129, which in turn olds a Bakelite clamping or retaining ring 130 by means f bolts 121. The peripheral clamping assembly 121 is hifted upwardly with the web clamping support plate 02 and the retaining ring 130 engages the longitudinal eripheral margins of the web during the molding operaon, that is where the lower die frame 6 is shifted to the molding" position. Furthermore, the transversely exending retaining rings 130 engage transverse sections of ıe underside of the web 1, which constitutes an area f the web 1 lying between each of the upper and lower ie frames 11, 12 and the mounting plate 84. This structure is more fully illustrated in FIGURES 4 and 5.

OPERATION

In use, the web 1 is continually advancing through the ıolding machine A by the web moving and gripping tructure 5. The molding carriage 4 is reciprocated in s forward and retracting movement by an automatic ystem (not shown) so that it intermittently advances ırough a predetermined path at the same speed as the eb 1. The cycle is started when the carriage 4, which at its rearwardmost position, moves simultaneously ith the web 1 in a forwardly direction. The cycle is ompleted when the carriage 4 has reached its forwardıost position and is then returned to its initial starting osition.

The driving mechanism, which is described in my aforeıentioned copending application Ser. No. 333,440, filed ec. 26, 1963, will cause the upper and lower die frames 1, 12 to shift in a vertical direction and engage the eb of thermoplastic material 1. At the end of the cycle, ıe upper and lower die frames 11, 12 are again withrawn to their extendedmost position, whch is the posion they assume at the start of each molding cycle.

As the carriage 4 begins its forward movement, the pper die frame which carries the molding dies 20 is ıoved downwardly by a distance of approximately 6 ıches. Simultaneously therewith, the lower die frame 12 egins its upward movement, the distance of upward avel also being approximately 6 inches. As the lower ie frame 12 begins to shift upwardly, the web clamping upport plate 102 will also start its upward movement nd will shift upwardly for approximately two inches. he separated position of the die frames is the position s illustrated in FIGURE 4, that is the position the pper and lower die frames assume with respect to each ther at the start of each cycle. At the end of each moldıg cycle, when the die frames have cooperated in the ıolding position, they cooperate in the manner as illusrated in FIGURE 5.

Each portion of the thermoplastic web 1 is located etween cooperating plug assists 85 and molding cavities 1. The retaining ring 120 of each clamping assembly ill engage the underside of the web 1, and hold the ame against the upper die frame in the manner as illusrated in FIGURE 5. Moreover, the peripheral clamping ing 130 will engage the underside of the web 1 and old the web against the cooling portions of the stripper plate also in the manner as illustrated in FIGURE 5. It should be observed that the compression spring 118 is slightly compressed and the upper shoe 112 is shifted downwardly into a "loaded" position. This type of clamping arrangement causes a blousing or stretching of the heated plastic sheet in order to have equal stock distribution in each of the containers formed.

After the engaging of the plastic by the retaining ring 120 and the clamping ring 130, the stem of the plug assists 85 force the heated portions of the thermoplastic web into the molding cavities 21. A vacuum is then maintained on the pressure chamber 34 which in turn provides communication with the cavities 21 through the ducts 35 and the spiral groove 35'. This vacuum is maintained on the molding cavity for approximately ½ second and air is supplied to the plug assist's side of the web for approximately ½ second. The vacuum maintained on the molding cavity aids in drawing the plastic material into the walls of the cavity and is assisted by the positive pressure surrounding the plug assists 85.

It can be seen by further reference to FIGURES 4 and 5 that the sealing ring 99 of the pressure applicator engages the underside of the web of thermoplastic material 1 and forces the same against the retainer ring 29'. As this occurs, the bellows portion of the pressure applicator 95 compresses slightly. It should be observed that since each of the molding dies 20 is water cooled, the plastic is cooled to the point where it achieves a dimensional set, and has a fair amount of rigidity so that the shape of the container thus formed is not destroyed as the die frame is separated.

At the end of the molding cycle when the die frames 11, 12 begin to separate, the positive air pressure from the manifold 101 is discontinued and positive pressure is no longer maintained on the plug assist side of the container thus produced. Furthermore, the pressure chamber 34 is now supplied with air under pressure, which is in turn supplied to each of the molding cavities 21, thereby forcing the formed container outwardly from the cavity 21. Referring now to FIGURE 3, it can be seen that the piston rod 59 was extended from the pneumatic cylinder 58, thereby forcing the stripper plate 42 to shift downwardly with respect to the upwardly moving die frame 11. The stripper plate 42 is, in effect, shifted downwardly where its maximum limit of travel is the maximum limit of extensible movement of the piston rod 59. At this point, the formed containers have been completely removed or separated from the walls of the molding cavities. Continued upward movement of the upper die frame 11 will also carry the stripper plate 42 and at the upper limit of travel of the upper die frame 11, the piston rod 59 is retracted thereby bringing the stripper plate 42 into contact with the lower surface of the die holding frame 15 in the manner as illustrated in FIGURE 3.

It should be observed that during the molding operation, a vacuum is maintained on the underside of the stripper plate 42. This vacuum is maintained between the lower surface of the die holding block 15 and the upper surface of the stripper plate 42 since the sealing ring 83 maintains an air-tight seal within the confines of the peripheral margains of the stripper plate 42 and die holding block 15. Furthermore, the vacuum is maintained around each of the molding cavities 21, since the vacuum is created in the space between the die holding block 15 and plate 42 and extends to the area formed by each of the retaining rings 29' in the manner previously described, thereby aiding in achieving equal stock distribution of the thermoplastic web 1 during molding operations. This vacuum also affects that portion of the web 1 which is not internally disposed in the molding cavities 21 and holds the same against the bottom face of the die holding block 15. Furthermore, it holds the unexposed portion of the web 1 against the stripper plate 42, thereby causing a partial dimensional set of that portion of the thermoplastic web 1.

It can also be seen by reference to FIGURES 4 and 5, that both the pressure applicators 95 and the retaining ring 120 will engage the underside of the web for a short interval after the lower die frame 12 begins to shift downwardly. This will prevent the container from adhering to the heated plug assist 85, and will also maintain a positive pressure on the underside of the container momentarily after the plug assist 85 begins to shift downwardly.

It can be seen that each of the aforementioned elements uniquely cooperate in order to provide the molded container. The plug assist 85 is heated to bring the thermoplastic material to the desired temperature and the molding cavities 21 are provided with a cooling media in order to effect a partial polymerization of the plastic material immediately after the molding operation. Furthermore, the molding cavities 21 and the plug assists are maintained under vacuum and positive pressure conditions, respectively, to assist in the molding operation. Immediately after the molding operation, the molding cavity is maintained under a positive pressure condition to aid in stripping the container thus formed from the walls of the molding cavity. Simultaneously therewith, the stripper plate 42 aids in stripping the container from the walls of the molding cavities 21, and is also water cooled in order to effect a partial polymerization of that portion of the web 1.

The molding machine of the present invention is uniquely designed to compensate for non-linearity in operation. The clamping mechanism is designed to provide isolation of an individual area within each clamping ring. The peripheral clamping ring causes a pre-stretch and allows only a fixed area for molding. In this manner, one combination of cavity-plug assist does not affect the neighboring cavity-plug assist combination and it is thereby possible to avoid environmental effects.

Having thus described the operation of the individual components in the molding machine and their cooperative association, it is now possible to describe the timing of each operation. As indicated above, the timing of each function performed in a molding cycle is important and materially affects the finished product. The time relationship of each of the operations in the molding machine is more fully illustrated in FIGURE 6. It is to be recognized, however, that the timing operations of the various driving mechanisms is not illustrated since these drives are more fully illustrated in my copending application Ser. No. 333,440, filed December 26, 1963, and in United States Letters Patent No. 2,967,328.

Figure 6:
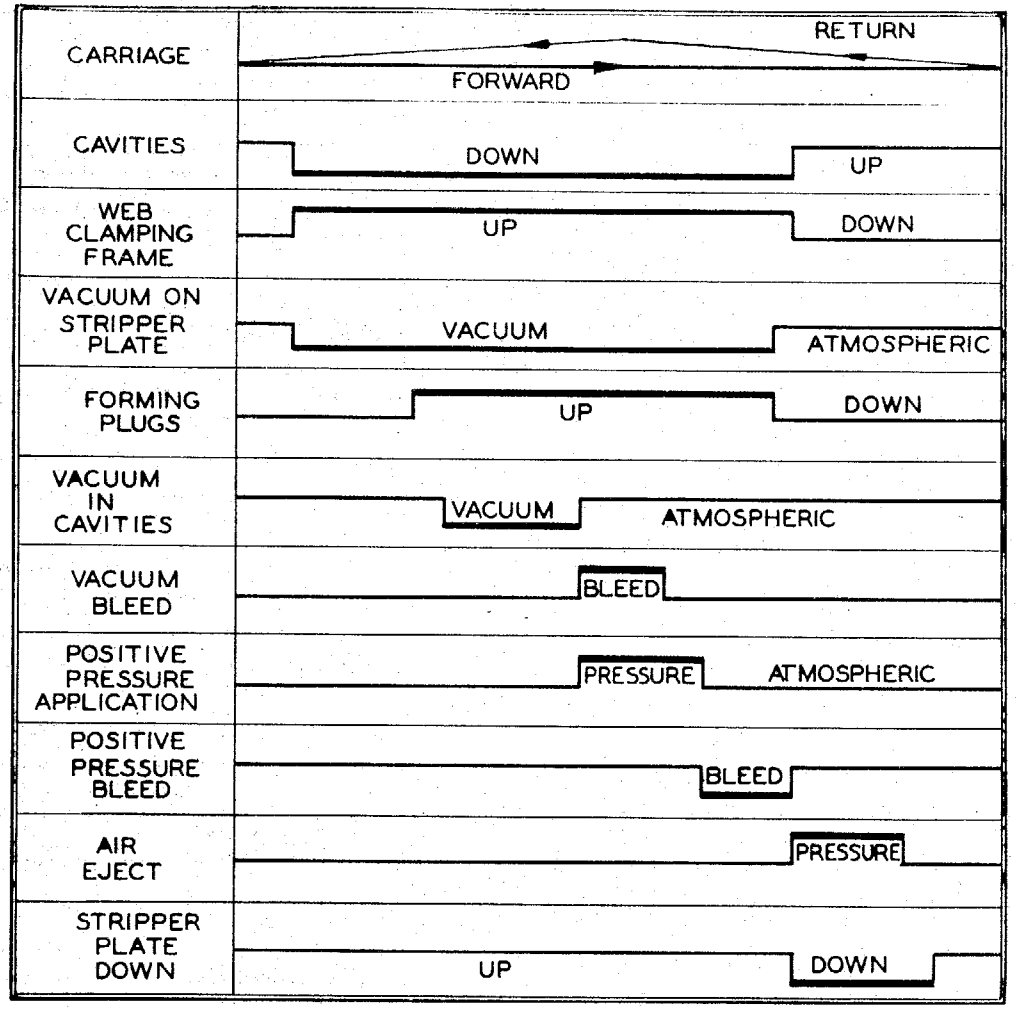
FIGURE 6 is a chart illustrating the cooperative tim-ıg relationship between the movement of the various lements and performance of various functions which re carried on in a complete cycle of operation.

By further reference to FIGURE 6. it can be seen that the molding carriage shifts horizontally at a uniform rate of speed for one entire molding cycle. At the end of each cycle, it has a return stroke where it shifts to its initial position. However, the molding carriage returns to its initial position at an accelerated rate of movement. Shortly after the molding carriage starts its forward movement, the die holding block 15 shifts downwardly to engage the web 1. Simultaneously with the downward shifting of the die holding block 15, the web clamping frame carrying the individual clamping members shifts upwardly. The die holding block 15 will shift downwardly for approximately 6 inches and the web clamping support plate 102 will shift upwardly for a distance of approximately 2 inches. However, the rate of movement is so adjusted so that each will strike the moving web of thermoplastic material simultaneously. Shortly after the die holding block 15 and the web clamping support plate 102 have started their movements toward the web, the lower die frame 12 is shifted upwardly so that the plugs engage the thermoplastic web in the selected areas of the cavities 21. This constitutes the initial forming operation.

After the selected portions of the web have been completely forced into the cavities 21 by the plug assists 85, a vacuum is maintained on each of the cavities. It is to be noted that the forming plugs 85 remain in the cavities 21 until a time slightly before the web clamping support plate 102 shifts downwardly and the die holding block 15 shifts upwardly. It is also to be noted that the vacuum is maintained in the cavities 21 commencing at a short time after the plug assists 85 reach their uppermost position. However, a vacuum bleed is initiated at the same time that the vacuum is removed from the cavities 21. By further reference to FIGURE 6, it can be seen that the maintenance of the vacuum in the cavities and the bleed operation is completed before the forming plugs 85 are shifted downwardly.

By additional reference to FIGURE 6, it can be seen that a vacuum is maintained on the stripper plate 42 holding the entire web 1 against the underside of the stripper plate 42. The vacuum is maintained on the stripper plate at the same time that the web clamping support plate 102 shifts upwardly and the die holding block 15 shifts downwardly. However, it is to be noted that the vacuum on the stripper plate is reduced shortly before the clamping plate 102 shifts downwardly and the die holding block 15 shifts upwardly.

Simultaneous with the commencement of the bleed in the cavities 21 to remove the vacuum therein, positive pressure is injected between the positive pressure applicator 95 and the plug assists 85. The positive pressure is maintained for a short time interval after the ceasing of the vacuum bleed in the cavities. Thereafter, positive pressure is bled from the area on the side of each of the cavities. This positive pressure bleed is maintained until the time that the die holding block 15 and the web clamping support plate 102 are shifted to their initial positions. At this time an air jet is maintained in each of the cavities 21, thereby forcing the formed cups from each of the cavities 21. Simultaneously with the air injection into each of the cavities 21, the stripper plate 42 is shifted downwardly and held separated from the die holding block 15 for a short time interval after the air injection ceases.

By additional reference to FIGURE 6, it can be seen that each of the operations have been completed at the time that the carriage reaches its forwardmost limit of movement. The carriage then returns at the accelerated rate of movement to its initial starting position where the next molding cycle is then completed in the manner as previously described.

It should be understood that changes and modifications in the form, construction, arrangement and combination of parts presently described and pointed out may be made and substituted for those herein shown without departing from the nature and principle of my invention.

Having thus described my invention what I desire to claim and secure by Letters Patent is:

1. A molding machine comprising a supporting frame, a pair of oppositely disposed first and second cooperating die frames operatively mounted on said supporting frame, at least one molding cavity formed in said first die frame, at least one plug formed on said second die frame and being sized to force the web into said cavity, means for passing a web of moldable material between said die frames, means for shifting the second die frame toward the first die frame and causing a plug to force a portion of the web into a cavity for a predetermined time interval, a fluid cooled web stripping plate covering the entire side of said first die frame disposed toward said web and being open only in the areas of the cavities to accommodate said plugs, and means associated with said web stripping plate to momentarily hold said web away from said last named die frame when the latter shifts away from the web.

2. A molding machine comprising a supporting frame, a pair of oppositely disposed first and second cooperating die frame assemblies operatively mounted on said supporting frame, at least one molding cavity formed in said first die frame assembly, at least one plug formed on said second die frame assembly and being sized to force the web into said cavity, means for passing a web of moldble material between said die frame assemblies, means or shifting the second die frame assembly toward the rst die frame and causing a plug to force a portion of the eb into a cavity for a predetermined time interval, a eb clamping frame operatively mounted on said supporting frame and being shiftable in timed relation to aid second die frame assembly, a plurality of clamping ngs mounted on said clamping frame and each of said ngs engaging a portion of the web extended [over] *eyond* the open portions of each of said cavities [causing such extended portion to drape], *biasing means operatively associated with said clamping rings to cause extensible movement thereof,* and [recess] means [operatively formed] *forming* [on the underside of said first ie frame assembly] *a recess* surrounding each of said avities *on the underside of said first die frame assembly* for accommodating], each of said *clamping* rings *engaging portions of the web and urging such portions into perative contact with said first die frame immediately eyond said recesses,* when the clamping frame is in its xtendedmost position.

3. The molding machine of claim 2 further characerized in that a web clamping rim is operatively mounted n and extending around the periphery of said web lamping frame, said rim being engageable with the peipheral margins of the portion of the web under the urface area of said first die frame assembly when the lamping frame is in its extendedmost position, biasing neans operatively associated with said web clamping rim or urging the engaged portions of the web into *operative* ontact with the lowermost surface of said first die frame ssembly.

4. The molding machine of claim 3 wherein said mahine is provided with means for imposing a vacuum on he side of the web disposed toward said first die frame hen said web clamping frame assembly is shifted to its xtendedmost position.

5. A molding machine comprising a supporting frame, pair of oppositely disposed first and second cooperating ie frames operatively mounted on said supporting frame, t least one molding cavity formed in said first die frame, t least one plug formed on said second die frame and beig sized to force the web into said cavity, means for assing a web of moldable material between said die rames, means for shifting the second die frame toward he first die frame and causing a plug to force a portion f the web into a cavity for a predetermined time interval, positive pressure applicator extending around each of aid plugs forming an annular pressure space therebeween, means on the upper end of said applicators for ngaging portions of the web in pressure sealing condiions, means for creating a vacuum in said cavity after aid portion of the web has been introduced thereinto, and neans for [bleeding the vacuum condition in said cavity nd for simultaneously] injecting a fluid in said annular ressure space thereby creating a positive pressure conlition around each of said plugs to assist in the forming f the webs in each of said cavities.

6. The molding machine of claim 5 further characterzed in that a means is provided for [creating a vacuum n each of said cavities in timed relation to the creation f a positive pressure around said plugs to assist in the orming of the web] *heating said plugs.*

7. The molding machine of claim 5 further characterzed in that a means is provided for momentarily creatng a positive pressure on the side of the web disposed oward said cavities for releasing the web from the walls f the cavities.

8. The molding machine of claim 5 further characterzed in that a means is associated with said pressure aplicator to momentarily maintain a positive pressure conlition on the web in each of said cavities when said secnd die frame begins to shift away from said web.

9. The molding machine of claim 5 further characterzed in that the molding machine is provided with means for clamping portions of the web circumscribing each of said pressure applicators against said first die frame when said pressure applicators engage said web.

10. A molding machine comprising a supporting frame, a pair of oppositely disposed first and second cooperating die frames operatively mounted on said supporting frame, at least one molding cavity formed in said first die frame, at least one plug formed on said second die frame and being sized to force the web into said cavity, means for passing a web of moldable material between said die frames, means for shifting the second die frame toward the first die frame and causing a plug to force a portion of the web into a cavity for a predetermined time interval, means for heating said plug during the portion of the time that it forces the web into said cavity, a web clamping frame operatively mounted on said supporting frame and being shiftable in timed relation to said second die frame, an individual clamping ring surrounding each plug and being mounted on said clamping frame for engaging a portion of said web extended [over] *beyond* the open portions of each of said cavities [causing said extended portions to drape around each of said cavities] *biasing means operatively associated with said clamping rings to cause extensible movement thereof and enabling said rings to engage the portions of the web extended beyond said open portions of the cavities* prior to engagement of the web by the plug, a clamping rim operatively mounted on and extending around the periphery of said web clamping frame, said rim being engageable with the peripheral margins of the portion of the web under the surface area of said first die frame when the clamping frame is in its extended most position, means for cooling said cavities to cause a dimensional set and rigidity of the web contained therein, first vacuum means associated with each of said cavities for causing a vacuum to be maintained thereon for forcing the web against the walls of the cavity, a positive pressure applicator extending around each of said plugs forming an annular pressure space therebetween, means on the upper end of said applicators for engaging portions of the web in pressure sealing conditions, means for injecting a fluid in said annular pressure space creating a positive pressure condition around each of said plugs to assist in the forming of the webs in each of said cavities, a fluid cooled web stripping plate covering the entire side of said first die frame and being open in the areas of the cavities, means for adding a coolant fluid to said web stripping plate, second vacuum means maintaining a vacuum on the side of the web associated with said first die frame for holding said web against said stripper plate when the second die frame shifts away therefrom, means for momentarily creating a positive pressure on the side of the web disposed toward the said cavities for releasing the web from the walls of the cavities when the plug shifts outwardly thereof, and means operatively associated with said web stripping plate to momentarily hold said web away from said first die frame when the latter shifts away from the web.

11. A molding machine comprising a supporting frame, a pair of oppositely disposed first and second cooperating die frames operatively mounted on said supporting frame, at least one molding cavity formed in said first die frame, at least one plug formed on said second die frame and being sized to force the web into said cavity, means for passing a web of moldable material between said die frames, means for shifting the second die frame toward the first die frame and causing a plug to force a portion of the web into a cavity for a predetermined time interval, a web clamping frame operatively mounted on said supporting frame and being shiftable in timed relation to said second die frame, a web stripping plate operatively mounted on the underside of said first die frame and being shiftable with respect thereto for momentarily holding the web away from the first die frame when the latter is shifting, said stripping plate being open in the areas of the cavities to accommodate plugs, a positive pressure applicator extending around each of said plugs and thereby forming an annular pressure space therebetween, said pressure applicators being capable of engaging and creating a pressure sealing condition against the web, when the second die frame is shifted, means for shifting said first die frame to the molding position and for simultaneously shifting the clamping frame to the molding position, means for simultaneously creating a vacuum on the stripper plate, means for shifting said second die frame toward the molding position after said first die frame has reached the molding position, means for creating a vacuum in each of said cavities after the second die frame has reached the molding position and for reducing the vacuum after a predetermined amount of time, means for creating a positive pressure condition between each of said plugs and said pressure applicators simultaneously with the release of the vacuum in the cavities, means for eliminating the positive pressure condition around said plugs after a predetermined amount of time and for simultaneously creating a pressure condition in each of said cavities, and means for shifting said stripper plate into retaining condition with the web simultaneously with the injection of air into each of said cavities and for holding said stripper plate away from said first die frame until after the injection of air into said cavities has ceased.

12. A molding machine comprising a supporting frame, a pair of oppositely disposed first and second cooperating die frames operatively mounted on said supporting frame, at least one molding cavity formed in said first die frame, at least one plug formed on said second die frame and being sized to force the web into said cavity, means for passing a web of moldable material between said die frames, means for shifting the second die frame toward the first die frame and causing a plug to force a portion of the web into a cavity for a predetermined time interval, a fluid cooled web stripping plate covering the entire side of said first die frame disposed toward said web and being open only in the areas of the cavities to accommodate said plugs, means for creating a vacuum between said first die frame and said stripper plate, means for conducting said vacuum through said stripper plate and to the side of the stripper plate facing said web for holding said web against said stripper plate, and means associated with said web stripping plate to momentarily hold said web away from said last named die frame when the latter shifts away from the web.

*13. A molding machine comprising a supporting frame, a pair of oppositely disposed first and second cooperating die frame assemblies operatively mounted on said supporting frame, at least one molding cavity formed in said first die frame assembly, at least one plug formed on said second die frame assembly and being sized to force the web into said cavity, means for passing a web of moldable material between said die frame assembly, means for shifting the second die frame assembly toward the first die frame and causing a plug to force a portion of the web into a cavity for a predetermined time interval, a web clamping frame operatively mounted on said supporting frame and being shiftable in timed relation to said second die frame assembly, a plurality of clamping rings mounted on said clamping frame and each of said rings engaging a portion of the web extended beyond the open portions of each of said cavities, a pressure applicator also extending around each of said plugs forming an annular pressure space therebetween, engageable means on the upper ends of said applicators for engaging said webs in pressure sealing condition and for causing such extended portions to drape, and recess means operatively formed on the underside of said first die frame assembly surrounding each of said cavities for accommodating each of said engageable means of said pressure applicators.*

*14. A molding machine comprising a supporting frame, a pair of oppositely disposed first and second cooperating die frames operatively mounted on said supporting frame, at least one molding cavity formed in said first die frame, means for passing a web of moldable material between said die frames, at least one plug formed on said second die frame and being sized to force the web into said cavity, means for shifting the second die frame toward the first die frame and causing a plug to force a portion of the web into a cavity for a predetermined time interval to produce a molded article, a positive pressure applicator extending around each of said plugs forming an annular pressure space therebetween enabling the conveyance of fluid under pressure in said annular pressure space to said web, means forming part of said applicators enabling extension and contraction thereof during conditions of pressure, means on the upper end of said applicators for engaging portions of the web in pressure sealing conditions, means for creating a vacuum in said cavity after said portion of the web has been introduced thereinto, and means for injecting a fluid in said annular pressure space in timed relation to the creating of a vacuum and thereby creating a positive pressure condition around each of said plugs to urge said web into said cavities and to assist in the forming of the web in each of said cavities.*

*15. The molding machine of claim 14 further characterized in that a means is provided for momentarily creating a positive pressure on the side of the web disposed toward said cavities for releasing the web from the walls of the cavities.*

*16. The molding machine of claim 14 further characterized in that a means is associated with said pressure applicators to momentarily maintain a positive pressure condition on the web in each of said cavities when said second die frame begins to shift away from said web.*

*17. The molding machine of claim 14 further characterized in that the molding machine is provided with means for clamping portions of the web circumscribing each of said pressure applicators against said first die frame when said pressure applicators engage said web.*

References Cited

The following references, cited by the Examiner, are of record in the patened file of this patent or the original patent.

UNITED STATES PATENTS

| | | | |
|---|---|---|---|
| 2,967,328 | 1/1961 | Shelby et al. | 18—19 F |
| 3,025,566 | 3/1962 | Kostur | 18—19 F |
| 3,105,270 | 10/1963 | Fibish | 18—19 F |
| 3,193,881 | 7/1965 | Kostur | 18—19 F |
| 1,760,288 | 5/1930 | Stevens | 18—19 |
| 1,801,613 | 4/1931 | Ratzer | 18—19 |
| 2,521,387 | 9/1950 | Maynard et al. | 18—19 |
| 3,208,104 | 9/1965 | Hessel | 19—19 |

ROBERT L. SPICER, Jr., Primary Examiner

U.S. Cl. X.R.

425—384, 388, 437, 351